Patented Dec. 31, 1935

2,025,715

UNITED STATES PATENT OFFICE 2,025,715

METHOD FOR CLARIFYING LIQUIDS AND PRODUCING USEFUL PRODUCTS

John C. Bird, Elizabeth, N. J., assignor to Standard Oil Development Company, a corporation of Delaware No Drawing. Application December 21, 1931, Serial No. 582,508

18 Claims. (Cl. 210—9)

This invention relates to a method of decolorizing liquids of dissolved or suspended coloring matter and to the production of useful products.

When hydrocarbon oils such as petroleum oils, coal tar distillates, products of liquefaction of coal, lignite, peat, etc. and their distillation or conversion products of destructive distillation, hydrogenation, destructive hydrogenation and the like are treated with strong sulfuric acid or sulfuric anhydride, a by-product commonly known as acid sludge is formed. This product is normally heavier than the oil treated and separates as a bottom layer, especially when the treating is conducted with fuming sulfuric acid containing about 20% by weight free sulfuric anhydride. This sludge is usually considered to consist of sulfonic acids, excess sulfuric acid, and other organic material, some of which are in solution while others are colloidally dispersed throughout the sludge. This invention embodies using such acid sludges, or sulfonic acids derivable therefrom, for the decolorization and clarification of aqueous liquids and the production of new and valuable pigments or lakes.

My invention will be fully understood from the following example:

An acid sludge, such as that obtained by treating white oil stock with strong sulfuric acid, is mixed with water in such proportion to give after settling an aqueous bottom layer containing approximately 35 to 45% sulfuric acid. The mixture is then heated to approximately 80 to 100° C. and is agitated continuously with a stream of steam or air to remove sulfur dioxide. After most of the sulfur dioxide is drawn off the material is allowed to stand and settle. The bottom aqueous sulfuric acid layer is then drawn off and may be purified and concentrated for reuse, according to known methods.

The remaining top layer is called a washed acid sludge, and contains substantially all the organic material of the original sludge with a small amount of free sulfuric acid, depending upon the extent of the water dilution. On addition of water soluble compounds of calcium or barium to this acid sludge, a precipitate is formed which appears to consist largely of sulfonates.

The washed acid sludge is diluted with about 1 to 5 volumes of water and is added to an aqueous solution of a water soluble dye. A solution of barium hydroxide is then added in sufficient quantity to neutralize the acid present. A bright colored precipitate is formed which contains substantially all the dye, leaving a clear and substantially colorless water solution. This precipitate retains the coloring matter tenaciously, so that it can not be removed by ordinary means, as by washing with water. The precipitate may be readily suspended in water, and may be used in inks, pigment wall colors, and for coloring paper or other fibrous or textile materials. This precipitate is also a valuable pigment and may be used in surface coating compositions, such as paint, for impregnation in plastic moulded or compounded articles, and for other uses for which pigments and lakes are generally suitable. In explanation, it appears that the heavy sulfonic acid salts adsorb and retain the dye. Some barium sulfate is also precipitated due to the free sulfuric acid remaining in the sludge, and is valuable as a filler. If additional filler is desired a larger proportion of free acid may be left in the sludge, or additional acid may be added. The precipitate also adsorbs some light acid salts which act as penetrating or wetting agents.

Bases, for example, oxides or hydroxides of other alkaline earth metals, such as calcium or strontium may be used in place of barium compounds in the clarification step, and in general metals capable of forming water-insoluble sulfonates are suitable for clarification of the liquid. Barium salts are especially preferred when the precipitate is to be used as a pigment or lake, while the calcium and strontium precipitates are not as pure in color, and are more sticky and difficult to handle. Lime or other calcium compounds are suitable, however, for crude industrial clarifications, as for the treatment of textile mill waste water, muddy water, sewage, and similar liquors.

The crude acid sludge may be used directly, without washing, if desired, and is especially suitable where the solutions to be clarified are alkaline.

The washed sludge may also be subjected to additional purification before use, if desired, and the free sulfuric acid and the sulfonic acids capable of forming water-soluble alkaline earth sulfonates and other organic matter may be removed by various methods. Extraction of the sludge with water insoluble organic solvents such as secondary butyl alcohol, tertiary amyl alcohol and the like, separates free sulfuric acid. Extraction with water soluble organic solvents such as methyl, ethyl or isopropyl alcohol, acetone, and the like, separates tarry matter and oil, and, if the sludge has been previously neutralized with an alkali, alkali sulfates.

The original or washed sludge may also be neutralized with an alkali metal compound or ammonia and then used directly for the clarification of liquids as already described. The purified water soluble sulfonic acids, capable of forming water insoluble alkaline earth sulfonates, and their water soluble salts, such as the sodium sulfonates, may also be used.

These purified sludges, or the highly purified sulfonic acids and their soluble salts, giving insoluble salts with alkaline earths, are especially desirable when solutions of high purity are to be clarified. For example, while a solution of sugar syrup may be substantially clarified with any of the sludges described, these highly purified sulfonic extracts are preferred.

The filtrate remaining after the formation of a precipitate from the washed acid sludge, as above described, contains water soluble alkaline earth sulfonates. These may be converted into alkali salts by the addition of sodium carbonate, potassium sulfate, etc., the resulting insoluble barium salt being removed as a precipitate. The filtrate may then be evaporated to dryness by means of a drum or spray drier. The alkali sulfonates so produced are powerful wetting agents or detergents, do not stain fabrics, paper or other absorptive materials with which they are impregnated, and differ in this respect from the corresponding material obtained from calcium or magnesium salts which has been found to cause a dark brown stain. Furthermore the alkali compounds prepared in this manner will not form a precipitate with hard or salty water.

In clarifying colored aqueous solutions containing suspended material by the forming of a precipitate therein from acid sludge with calcium or other metals than barium, the liquid after the precipitation though clear may remain somewhat colored. In this case it may be desirable to use additional means to effect the complete decolorization of the solution. This may be done by treating the aqueous solution with small amounts of substances possessing high coagulating power. For example, an addition of about 1% of aluminum sulfate or chloride may improve the color to a great extent.

This invention is not to be limited to any theory of the chemical constitution of the acid sludges described herein or their derivatives, nor by examples given for purpose of illustration, but only by the following claims in which I wish to claim all novelty as far as the prior art permits.

I claim:

1. An improved method for removing coloring matter from aqueous liquids comprising adding water soluble compounds selected from the group consisting of sulfonic acids and their salts capable of forming substantially water insoluble alkaline earth sulfonates to said aqueous liquid, causing the formation of water insoluble sulfonates therein as a precipitate whereby said coloring matter is adsorbed on such precipitate and removing said precipitate from said liquid.

2. An improved method for removing coloring matter from aqueous liquids comprising adding thereto a water soluble sodium sulfonate capable of forming water insoluble alkaline earth sulfonate and an alkaline earth compound to form a precipitate in said liquid comprising a water insoluble alkaline earth sulfonate containing said coloring matter, and removing said precipitate.

3. Process according to claim 2 in which an aqueous solution of sodium sulfonate prepared from a petroleum oil acid sludge and capable of producing water insoluble alkaline earth sulfonates is added to the aqueous liquid and an aqueous solution of an alkaline earth compound is added to cause the formation of precipitate.

4. An improved process for decolorizing an aqueous solution of a dye comprising adding thereto a washed hydrocarbon oil acid sludge consisting substantially of sulfonic compounds, separately adding an aqueous solution of an alkaline earth compound and removing a precipitate of alkaline earth sulfonates containing said dye.

5. Process according to claim 4 in which a substantially colorless aqueous solution of a petroleum oil acid sludge is added to supply the water soluble sulfonates.

6. Process according to claim 4 in which an aqueous solution of barium hydroxide is added to the aqueous solution of dye and acid sludge to neutralize the acidic constituents of the acid sludge and to form a precipitate comprising barium sulfonate.

7. Process according to claim 4 in which the alkaline earth compound is added as an aqueous suspension of an alkaline earth oxide.

8. An improved method for producing a water insoluble colored pigment comprising forming a precipitate of water insoluble sulfonates of high molecular weight in an aqueous solution of a dye.

9. A composition of matter comprising a water insoluble substance obtained by reaction of a hydrocarbon oil acid sludge consisting substantially of sulfonic compounds with an alkaline earth and containing adsorbed coloring matter.

10. A composition of matter comprising a water insoluble alkaline earth sulfonate containing adsorbed coloring matter.

11. A composition of matter comprising a water insoluble alkaline earth sulfonate containing adsorbed coloring matter and prepared from the sulfonic acids of hydrocarbon oil acid sludge.

12. A composition of matter comprising a water insoluble precipitate formed from a hydrocarbon oil acid sludge consisting substantially of sulfonic compounds and a reactive compound of barium in an aqueous liquid, containing adsorbed dye.

13. The process which comprises simultaneously clarifying aqueous liquids containing substances of the class of dissolved or suspended coloring matter and producing a useful pigment by precipitating with a petroleum sulfonic compound an insoluble sulfonate salt in said liquids, whereby the coloring matter is adsorbed by the precipitate.

14. Process according to claim 13, in which the precipitation is effected by first adding to the colored liquid a water-soluble petroleum sulfonate and then adding a compound capable of precipitating the sulfonate as an insoluble salt.

15. As a composition of matter, a pigment comprising an insoluble petroleum sulfonate salt containing adsorbed coloring matter.

16. An improved method of clarifying aqueous liquids containing substances of the class consisting of dissolved coloring matter and suspended solids, comprising adding thereto a hydrocarbon oil acid sludge consisting substantially of sulfonic compounds, forming a precipitate of a water insoluble sulfonate in said liquid, and removing said precipitate.

17. An improved process for clarifying aqueous liquids containing substances of the class consisting of dissolved coloring matter and suspended solids, comprising adding thereto a water soluble portion of a sludge produced in treating petroleum oils with compounds selected from the group consisting of sulfuric anhydride and sulfuric acid, forming a precipitate of water insoluble sulfonate in said liquid, and removing said precipitate.

18. The process for clarifying aqueous liquids containing substances of the class consisting of dissolved coloring matter and suspended solids, which comprises precipitating therein an insoluble sulfonate salt and removing said precipitate.

JOHN C. BIRD.